Oct. 30, 1923.

W. ABILDGAARD 1,472,262

FRUIT AND NUT HARVESTER

Filed Oct. 29, 1921

INVENTOR
W. ABILDGAARD

ATT'YS.

Oct. 30, 1923.
W. ABILDGAARD
1,472,262
FRUIT AND NUT HARVESTER
Filed Oct. 29, 1921
2 Sheets-Sheet 2
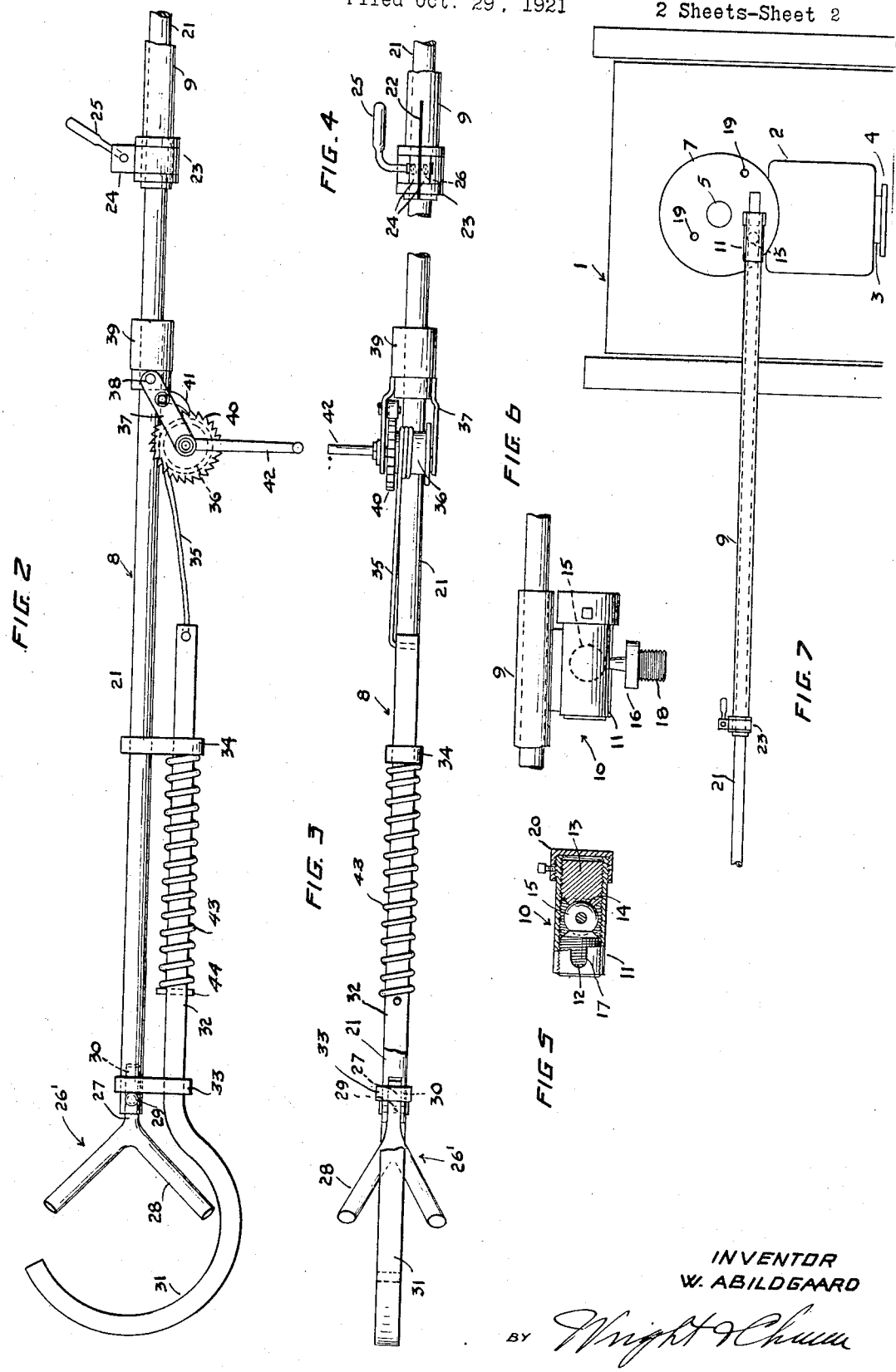
INVENTOR
W. ABILDGAARD
BY Wright & Chum
ATT'YS Patented Oct. 30, 1923.

1,472,262

UNITED STATES PATENT OFFICE.

WILLIAM ABILDGAARD, OF CHICO, CALIFORNIA.

FRUIT AND NUT HARVESTER.

Application filed October 29, 1921. Serial No. 511,336.

*To all whom it may concern:*

Be it known that I, WILLIAM ABILDGAARD, a citizen of the United States, residing at Chico, in the county of Butte and State of California, have invented new and useful Improvements in Fruit and Nut Harvesters, of which the following is a specification.

The present invention relates to apparatus for dislodging or shaking nuts or fruit from trees bearing the same.

It is at present the common practice to remove prunes and other fruit and nuts from the trees by dislodging the fruit or nuts with sticks or to pick the fruit or nuts by hand. In using sticks the trees are often injured and the next season's crop is usually impaired by having small growths, known as "spurs" and which constitute the fruit or nuts of the next season, knocked off or bruised by the sticks. The hand picking process is tedious, slow and costly, all to such an extent as to render this method prohibitive in large harvesting operations.

With my invention the use of sticks or the hands in harvesting or removing the fruit or nuts from the trees is done away with and the difficulties and objections attending use of the methods above noted are likewise eliminated.

An object of the invention is to provide harvesting apparatus for fruit and nut trees, with which the trees are mechanically shaken sufficiently to dislodge the fruit and nuts from the branches without injuring the trees, in a more reliable, time saving and expeditious manner than can be accomplished with methods and apparatus heretofore employed.

Another object is to provide a harvester of the character described which may be attached to one of the major limbs of a tree and operated for a short period of time, whereupon the tree will be shaken sufficiently to dislodge the fruit or nuts from the branches and cause it to drop to the ground, thus effecting a quick, thorough and comparatively inexpensive removal of the fruit or nuts from the tree.

A further object is to provide a harvester of the character described in which the tree shaking apparatus is adjustable and quickly attachable to trees of various sizes and kinds.

An additional object is to provide a harvester of the character described which is simple as to construction, consists of few parts and is comparatively inexpensive as to construction and operation.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 2 is a top plan view of the shaking arm and limb clamp.

Fig. 3 is a fragmentary side elevation of the limb clamp and arm shown in Fig. 2.

Fig. 4 is a fragmentary elevation of one of the adjusting devices.

Fig. 5 is a detail sectional view of the crank pin connection means.

Fig. 6 is a side elevation of the crank connection means.

Fig. 7 is a fragmentary plan view of the apparatus showing the manner of connecting the shaking device with the motor.

Figure 1:
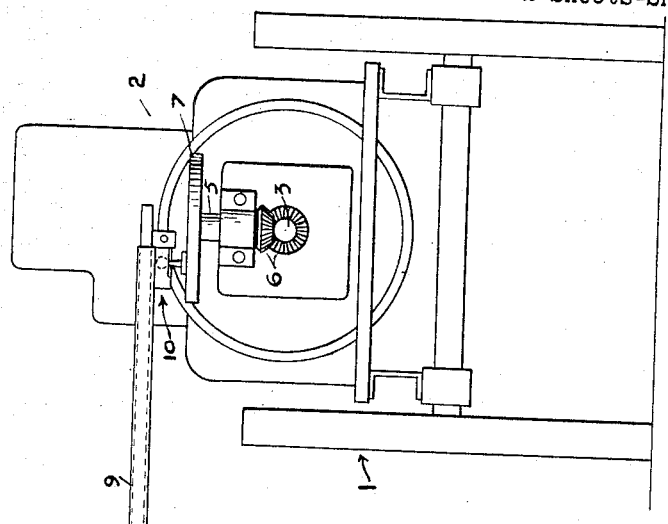
Fig. 1 is a side elevation of the harvester of my invention showing it ready for use.
Figure 1:
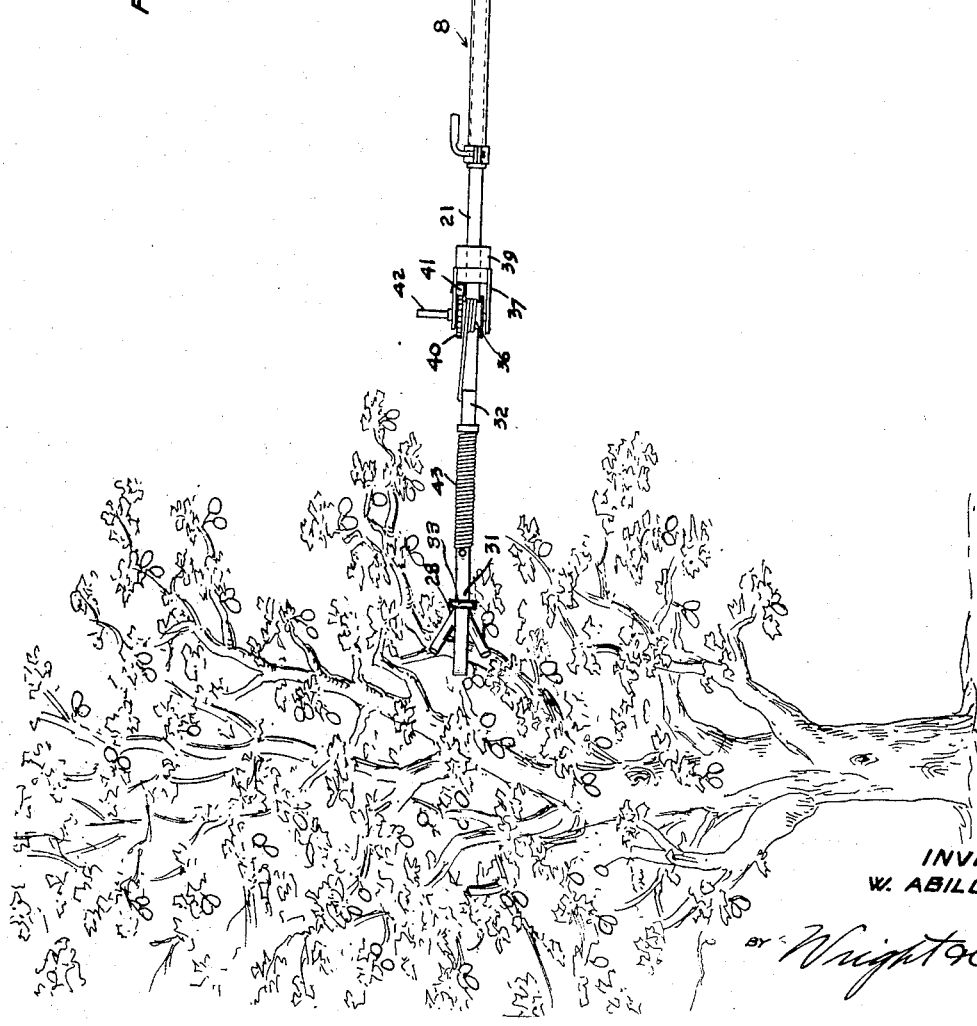

Referring to the drawing in which the apparatus disclosed exemplifies one embodiment of my invention, 1 designates a wagon or other vehicle on which a motor 2 (gasoline), is supported. The motor 2 drives a shaft 3 mounted in and operatively associated with a suitable clutch 4 whereby the shaft may be declutched, as desired. The shaft 3 drives an upright shaft 5 thru bevel gears 6 on the respective shafts and a horizontal wheel 7 is fixed to and rotated by the shaft 5. Any suitable means may be used, however, for driving the wheel 7.

Tree shaking means, generally designated 8, is associated with and operated by the wheel 7. This means is adapted to be attached to a tree to be shaken, preferably to one of the major limbs, and is adjustable so that it may be used with trees of various sizes and kinds.

The means 8 comprises a main tubular rod or bar 9 having means 10 for operatively connecting its inner end to the wheel.

The means 10 comprises a tubular member 11 having internally screw threaded open ends, in which latter screw threaded bearing elements 12 and 13 are adjustably mounted. The elements 12 and 13 have concaved bearing faces 14 adapted to engage opposite sides of the ball head member 15 of a crank pin 16. The tubular member 11 is longitudinally slotted as at 17 thru one end and thus provides for insertion of the ball 15 into the tube. The pin 16 has a threaded shank 18 adapted to be screwed into one of a number of off centre openings 19 formed in the wheel. The openings 19 are varyingly spaced from the centre of the wheel so as to provide for varying the throw or crank action of the rod 9. The tubular rod 9 is held upon the tubular member 11 by a suitable clamp or other fastening device 20. The bearings 12 and 13 may be adjusted to compensate for wear thereof by screwing them inwardly. The connection between the rod 9 and wheel thus provides for reciprocating the rod upon rotation of the wheel and also permits of movement of the rod into various positions, dependent on the height or position of the limb of the tree to which the shaking means is to be attached.

A rod 21 telescopes within the tubular rod 9 and may be extended or moved inward, as desired. The outer end of the tubular rod 9 is split as at 22 and a split collar 23 with lugs 24 on its ends surrounds said end. A screw handle 25 is turned in screw threaded openings 26 in the lugs and when turned to tighten the collar, the tubular rod 9 will contract and clamp the extensible rod 21 so as to hold the same against movement. In this way the rod 21 may be held in adjusted position.

The outer end of the rod 21 carries a jaw 26′ comprising a body 27 and several divergent prongs or arms 28, there preferably being four of said arms. The body portion 27 is pivoted as at 29 in the bifurcated end 30 of the rod 21 so as to have a slight rocking movement, the prongs being of such shape and arrangement as to effectively engage the trunk or limb of a tree, as shown in Fig. 1. Cooperating with the jaw is an arcuate clamping hook 31 arranged to be moved towards and away from the jaw and to embrace the trunk of a tree, as shown in the drawings. The hook 31 has a straight shank 32 slidable in guide bearings 33 and 34, which latter are fixed to the rod 21. The inner end of the shank 32 has a flexible element 35 secured thereto, and said element is secured to and adapted to be moved upon the drum 36 rotatably mounted in a bracket 37, secured as at 38 to a collar 39, fixed to the rod 21. The drum 36 has a ratchet member 40 thereon cooperating with which is a pawl 41 carried by the bracket 37. A crank arm handle 42 is associated with the drum so as to provide for turning thereof. An expansion spring 43 is mounted upon the shank 32 with one end abutting the bearing 34 and its other end abutting a pin 44 carried by the shank. This spring normally holds the hook 31 in spaced relation to the jaw such that the clamping device may be placed in position upon the trunk or limb of a tree.

Operation.

While it is obvious that the apparatus of my invention may be used for shaking fruit and nut trees of various kinds, I shall describe its operation in connection with fruit trees.

The wagon or vehicle 1 is drawn or operated between the rows of trees close enough to permit the shaking device 8 to be attached to the trees. As prune trees are comparatively low the operator may, in most cases, clamp the jaws 26′ and hook 31 upon one of the major limbs or upon the trunks of the trees, while standing on the ground. Thus, the rod 9 is moved so as to extend towards the tree to be shaken and if necessary the rod 21 is extended to bring the jaw 26′ in position to partly embrace the major limb or trunk of the tree, as shown in Fig. 1. The adjustment of the rod 21 may be set by tightening the collar 23 whereupon the tubular rod 9 will grip and hold the rod 21 against movement. After the jaw and hook are caused to embrace the tree or limb, the clamping of the limb or trunk is effected by turning a crank handle 42 and winding the flexible element 35 of the drum 36. This pulls inwardly upon the shank 32 and causes the hook 31 to clamp the trunk or limb between the prongs 28 of the jaw 26′. The pawl 41 cooperating with the ratchet 40 will hold the clamping device in clamping position against the action of the spring 43.

As the motor is preferably running at all times between operations, with the wheel 7 declutched, the operator then operates the clutch so as to cause the wheel to be rotated. When the wheel rotates, the rods 9 and 21 will be rapidly reciprocated and the tree will be uniformly but severely shaken to such an extent that the fruit will be dislodged from the limbs and branches and fall to the ground where usually a canvas sheet is placed beneath the tree to catch the fruit. It is only necessary to cause the tree to be shaken a few times in order to shake the fruit therefrom and the entire operation will therefore require but a comparatively short time. As soon as the fruit has been shaken from the tree, the operator declutches the shaking, unclamps the jaws 26′ and hook 31 and moves on to the next tree or limb, where the operation is repeated. To unclamp the shaking device from the limb or trunk of a tree, it is only necessary to release the pawl 41 and the spring 43 will then expand so as to extend the shank 32 and hook 31. Thus the release of the device may be quickly effected and the jaw and hook will automatically move into position to again be clamped upon another tree. It is usually only necessary to clamp the device 8 onto one of the major limbs or branches of a tree to shake the entire tree sufficiently to dislodge the fruit. By means of the extensible rod 21 and jaw construction, the device 8 may be attached to trees of various sizes and kinds in an expeditious manner, since the adjustments may be easily and quickly effected with the special adjusting means provided. To vary the throw of the rods 9 and 21 and regulate the intensity of the shaking operation the crank pin may be set into any one of the differently located openings thereof, in the wheel 7.

The shaking device may be swung from one side of the wagon or vehicle to the other and made to operate upon the trees of two rows between which the wagon or vehicle is advanced.

It will thus be seen that I have provided a simple and inexpensive harvesting machine by means of which fruit and nuts may be harvested by being shaken from the trees, in a more reliable, expeditious and less expensive manner than heretofore carried out, without damaging the trees and with a minimum amount of labor.

I claim:

1. A harvesting machine embodying in its construction supporting means, a member adapted to be connected with a tree and means operatively associated with said member and supporting means for reciprocating said member and shaking the tree.

2. A harvesting machine embodying in its construction a support, a revolving member on said support, means for revolving said member, a rod, means of operative connection between the rod and said revolving member for reciprocating said rod upon rotation of the revolving member and means for securing said rod to a tree.

3. A harvesting machine embodying in its construction a support, a revolving member on said support, means for revolving said member, a rod, means of operative connection between the rod and said revolving member for reciprocating said rod upon rotation of the revolving member, means for securing said rod to a tree, said last named means comprising relatively movable jaws and means for holding one of the jaws in clamping position.

4. A harvesting machine embodying in its construction a support, a revolving member on said support, means for revolving said member, a rod, means of operative connection between the rod and said revolving member for reciprocating said rod upon rotation of the revolving member and means for securing said rod to a tree, said rod being pivotally connected with said revolving member and movable into various positions.

5. A harvesting machine comprising a portable motor, a shaking member adapted for engagement with a tree and means of connection between the motor and shaking member providing for movement of the shaking member such that the tree will be shaken or jarred.

6. Harvesting apparatus comprising portable operating mechanism, a shaking member adapted for engagement with a tree and means of operative connection between the operating mechanism and the shaking member providing for movement of the shaking member such that the tree will be shaken.

WILLIAM ABILDGAARD.